United States Patent
Yon et al.

(10) Patent No.: US 9,933,309 B2
(45) Date of Patent: Apr. 3, 2018

(54) DEVICE FOR DETECTING RADIATION INCLUDING AN ENCAPSULATING STRUCTURE HAVING AN IMPROVED MECHANICAL STRENGTH

(71) Applicant: Commissariat A L'Energie Atomique et aux Energies Alternatives, Paris (FR)

(72) Inventors: Jean-Jacques Yon, Sassenage (FR); Geoffroy Dumont, Paris (FR); Laurent Carle, Grenoble (FR); Pierre Imperinetti, Seyssins (FR); Stephane Pocas, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 19 days.

(21) Appl. No.: 15/047,966

(22) Filed: Feb. 19, 2016

(65) Prior Publication Data

US 2016/0245701 A1     Aug. 25, 2016

(30) Foreign Application Priority Data

Feb. 20, 2015   (FR) ..................... 15 51493

(51) Int. Cl.
*G01J 5/20*   (2006.01)
*G01J 5/04*   (2006.01)
(Continued)

(52) U.S. Cl.
CPC ............. *G01J 5/045* (2013.01); *G01J 5/0225* (2013.01); *G01J 5/20* (2013.01); *G01J 5/34* (2013.01)

(58) Field of Classification Search
None
See application file for complete search history.

(56) References Cited

U.S. PATENT DOCUMENTS 6,753,526 B2   6/2004   Vilain
6,924,485 B2   8/2005   Kanzaki
(Continued)

FOREIGN PATENT DOCUMENTS

EP   1 106 980 A1   6/2001
EP   1 359 400 A1   11/2003
(Continued)

OTHER PUBLICATIONS

French Preliminary Search report dated Jan. 27, 2016 in French Application 15 51493, filed on Feb. 20, 2015 ( with English Translation of Categories of Cited Documents and written opinion).

(Continued)

*Primary Examiner* — Edwin Gunberg
(74) *Attorney, Agent, or Firm* — Oblon, McClelland, Maier & Neustadt, L.L.P.

(57) ABSTRACT

A device for detecting electromagnetic radiation is provided, including a substrate; a matrix of thermal detectors disposed on the substrate; and a structure encapsulating the matrix of thermal detectors, including an encapsulating layer extending continuously around and above the matrix of thermal detectors so as to define with the substrate a cavity in which the matrix of thermal detectors is disposed, the encapsulating layer including at least one internal bearing section, which bears directly against the substrate between two adjacent thermal detectors of said matrix, said at least one internal bearing section including a sidewall and a peripheral wall, the sidewall being separate from the peripheral wall in a plane parallel to a plane of the substrate, and the peripheral wall encircling the matrix of thermal detectors.

15 Claims, 8 Drawing Sheets

(51) Int. Cl.
G01J 5/02 (2006.01)
G01J 5/34 (2006.01)

(56) References Cited

U.S. PATENT DOCUMENTS

| | | |
|---|---|---|
| 2005/0176179 A1 | 8/2005 | Ikushima et al. |
| 2007/0298534 A1 | 12/2007 | Ikushima et al. |
| 2010/0003789 A1 | 1/2010 | Caplet et al. |
| 2010/0314544 A1* | 12/2010 | Ouvrier-Buffet ....... G01J 5/045 250/338.4 |
| 2011/0114840 A1 | 5/2011 | Yamazaki et al. |
| 2011/0141286 A1 | 6/2011 | Vilain |
| 2013/0087933 A1* | 4/2013 | Pornin ................ B81C 1/00285 257/789 |
| 2013/0291380 A1 | 11/2013 | Yamazaki et al. |

FOREIGN PATENT DOCUMENTS

| | | |
|---|---|---|
| EP | 2 141 117 A1 | 1/2010 |
| EP | 2 581 339 A2 | 4/2013 |
| WO | WO 2013/079855 A1 | 6/2013 |

OTHER PUBLICATIONS

G. Dumont et al "Current progress on pixel level packaging for uncooled IRFPA", SPIE 8353-52 V.2, 2014, 8 pages.

* cited by examiner

Fig.1

(PRIOR ART)

Fig.2

(PRIOR ART)

DEVICE FOR DETECTING RADIATION INCLUDING AN ENCAPSULATING STRUCTURE HAVING AN IMPROVED MECHANICAL STRENGTH

TECHNICAL FIELD

The field of the invention is that of devices for detecting electromagnetic radiation, and in particular infrared or terahertz radiation, including a matrix of thermal detectors and an encapsulating structure that forms a hermetic cavity in which the matrix of detectors is housed. The invention is especially applicable to the field of infrared imaging and thermography.

STATE OF THE PRIOR ART

A device for detecting electromagnetic, for example infrared or terahertz, radiation conventionally comprises a matrix of what are referred to as elementary thermal detectors, each detector including a section able to absorb the radiation to be detected. With the aim of ensuring the thermal insulation of the thermal detectors, each section conventionally takes the form of a membrane suspended above the substrate and thermally insulated therefrom by thermally insulating holding elements. These holding elements also provide an electrical function as they are used to electrically connect the thermal detectors to a read circuit generally placed in the substrate.

To ensure optimal detector operation, a low pressure level is required. For this reason, the detectors are generally confined, or encapsulated, whether alone or in groups of two or more, in hermetic cavities that are under a vacuum or a low pressure.

Figure 1:
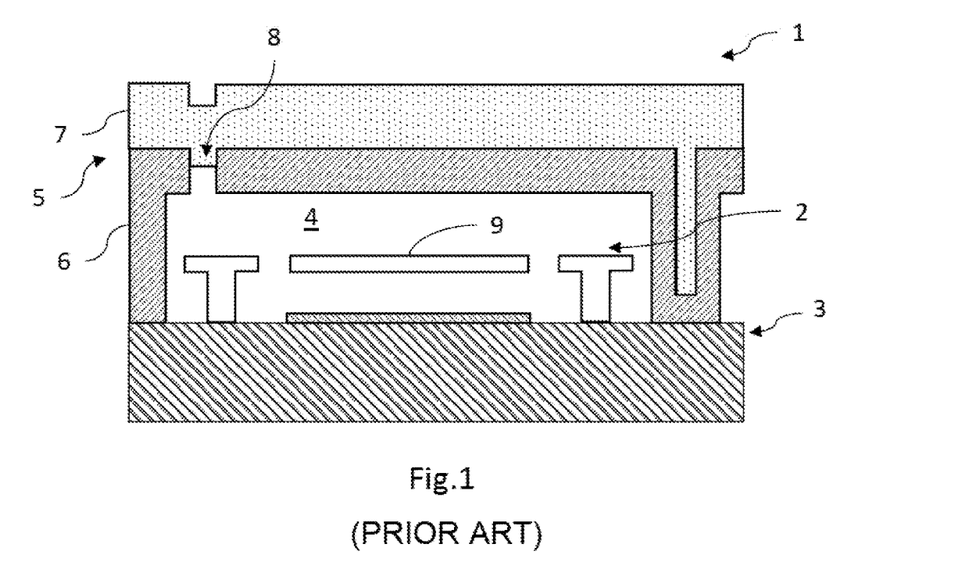
FIG. 1 is a schematic representation of a portion of a known detecting device.

FIG. 1 illustrates an exemplary detecting device 1 suitable for detecting infrared radiation, and more precisely one pixel of the detecting device, here formed by a bolometric detector 2 resting on a substrate 3 and placed alone in a hermetic cavity 4, such as described in the publication by Dumont et al, *Current progress on pixel level packaging for uncooled IRFPA*, Proc. SPIE 8353, Infrared Technology and Applications XXXVIII, 835311 2012.

In this example, the detecting device 1 includes an encapsulating structure 5, also called a capsule, that defines the cavity 4 in which the bolometric detector 2 is located. The encapsulating structure 5 includes a thin encapsulating layer 6 that defines with the substrate 3 the cavity 4, and a thin sealing layer 7 that covers the encapsulating layer 6 and ensures the hermeticity of the cavity 4. The encapsulating 6 and sealing 7 layers are transparent to the electromagnetic radiation to be detected.

The detecting device 1 is produced using techniques for depositing thin layers and especially sacrificial layers. During the production process, the sacrificial layers are stripped and removed from the cavity through one or more exhaust vents 8 provided in the encapsulating layer 6. The sealing layer 7 is used, after the sacrificial layers have been removed and the cavity 4 placed under vacuum, to block the exhaust vents 8. However, one drawback of this example is that the fill factor, i.e. the ratio of the area of the absorbing membrane 9 to the total area of the pixel, in the plane of the substrate, is decreased by the presence of the sections of the encapsulating structure 5 that encircle each thermal detector 2.

Figure 2:
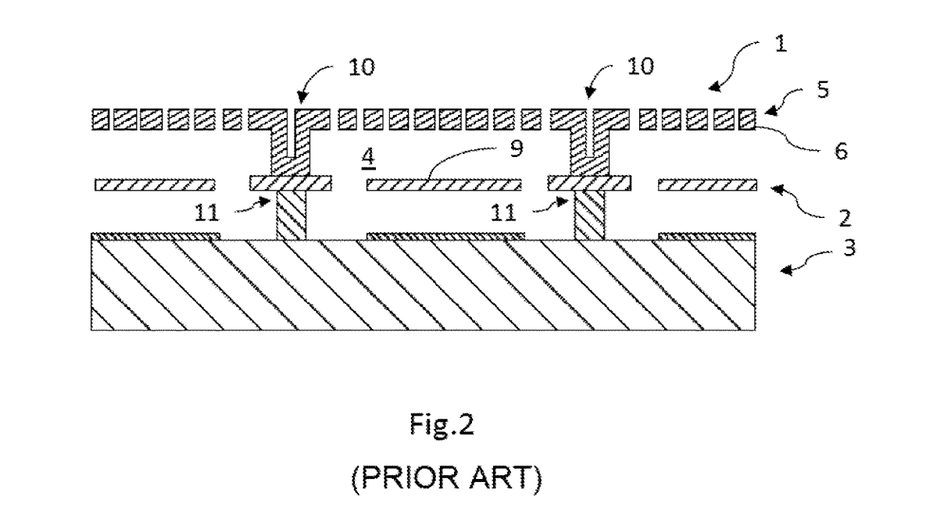
FIG. 2 is a schematic representation of a known detecting device.

FIG. 2 shows an exemplary device for detecting radiation which is similar to the example in FIG. 1 and such as disclosed in document WO201379855. In this example, a matrix of thermal detectors 2 is placed in one and the same hermetic cavity 4 and the thermal detectors are bolometers. The encapsulating structure 5 here forms a cavity that extends above and around the matrix of bolometric detectors 2. The encapsulating structure 5 includes a plurality of bearing sections 10 that each rest on the elements 11 holding the absorbing membranes 9. Although the fill factor is here increased, relative to that of the example in FIG. 1, by the absence of sections of encapsulating layer 6 encircling each detector 2, the mechanical strength of the encapsulating structure 5 remains however to be improved. In addition, because the encapsulating layer 6 makes contact with the elements 11 holding various thermal detectors via the bearing sections, there is a risk of parasitic electrical coupling between the detectors which may lead to a degradation of the electrical properties of the detecting device.

SUMMARY OF THE INVENTION

The aim of the invention is to at least partially remedy the drawbacks of the prior art, and more particularly to provide a device for detecting electromagnetic, for example infrared or terahertz, radiation including a matrix of thermal detectors placed in a hermetic cavity formed by an encapsulating structure, which has a high fill factor while the mechanical strength of the encapsulating structure is also reinforced.

One aim of the invention is also to provide a device for detecting electromagnetic radiation that minimises, or even removes, the risk of parasitic electrical coupling between the thermal detectors.

For this purpose, the invention provides a device for detecting electromagnetic radiation, comprising: a substrate; a matrix of thermal detectors, which matrix is placed on the substrate; and a structure encapsulating the matrix of thermal detectors, including an encapsulating layer extending continuously around and above the matrix of detectors so as to define with the substrate a cavity in which the matrix of thermal detectors is located.

According to the invention, the encapsulating layer comprises at least one section, which is what is referred to as an internal bearing section, located between two adjacent thermal detectors, and which bears directly against the substrate. Said internal bearing section includes a sidewall that is separate, in a plane parallel to the plane of the substrate, from a peripheral wall of the encapsulating layer which encircles the matrix of thermal detectors.

The detecting device may include a plurality of internal bearing sections each including a sidewall that delimits a profile of the internal bearing section in a plane parallel to the plane of the substrate, said profiles of the internal bearing sections being separate from one another.

The thermal detectors may each include an absorbing membrane suitable for absorbing the radiation to be detected, which membrane is suspended above the substrate and thermally insulated therefrom by anchoring pins and thermally insulating arms, and at least one internal bearing section may extend alongside the absorbing membranes of two adjacent thermal detectors along a longitudinal axis passing through two adjacent anchoring pins.

Each of said anchoring pins may participate in the holding above the substrate of the absorbing membranes of said two adjacent thermal detectors.

At least one internal bearing section may have a profile, in a plane parallel to the plane of the substrate, formed from a plurality of pairwise inclined longitudinal portions and/or may have a profile, in a plane parallel to the plane of the substrate, extending along a longitudinal axis between two ends of said profile, said profile at least widening at at least one of said ends.

The internal bearing section may have a profile, in a plane parallel to the plane of the substrate, of oblong shape, preferably with rounded longitudinal ends.

The internal bearing section may include a sidewall and a bottom portion, said sidewall extending substantially vertically over the entire height of the cavity, and the bottom portion making contact with the substrate.

The encapsulating layer may include at least one through-orifice that is what is referred to as an exhaust vent, having a transverse profile, in a plane orthogonal to the plane of the substrate, the width of which increases with distance from the substrate.

The encapsulating structure may furthermore include a sealing layer covering the encapsulating layer so as to make the cavity hermetic, the sealing layer including a border that extends in the direction of the thickness of the sealing layer, from the border of the exhaust vent, with a non-zero angle α relative to an axis substantially orthogonal to the plane of the substrate, and in which the transverse profile of the exhaust vent makes an angle β to the same orthogonal axis larger than the angle α.

The thermal detectors may each include a membrane suitable for absorbing the radiation to be detected, which membrane is suspended above the substrate and thermally insulated therefrom by anchoring pins and thermally insulating arms.

At least one internal bearing section may be placed between two adjacent absorbing membranes and two adjacent anchoring pins, each of said anchoring pins participating in the holding of said adjacent membranes, and in which the internal bearing section is oriented longitudinally along said membranes.

The encapsulating layer may comprise a plurality of through-orifices, which are what are referred to as exhaust vents, placed so that at least some of the thermal detectors each have a single exhaust vent located facing the corresponding absorbing membrane, preferably plumb with the centre of said membrane. In other words, the single vent is located plumb with the corresponding absorbing membrane, i.e. perpendicular to the absorbing membrane. The single vent is therefore not located facing the anchoring pins or the thermally insulating arms of the corresponding detector.

Each absorbing membrane may include a through-orifice facing the corresponding exhaust vent, of equal or larger size to that of said vent. In other words, said absorbing membrane, facing which is located an exhaust vent, may include a through-orifice located plumb with said exhaust vent and of equal or larger size to that of said vent.

The suspended membrane may include a stack of a bolometric layer, a dielectric layer that is structured so as to form two separate sections, and an electrically conductive layer that is structured so as to form three electrodes, two of said electrodes, which are intended to be raised to the same electrical potential, flanking the third electrode, which is what is referred to as the central electrode and which is intended to be raised to a different electrical potential, each electrode making contact with the bolometric layer, the central electrode being electrically insulated from the other electrodes by the dielectric layer, the orifice passing through the central electrode and the bolometric layer in a zone located between the sections of the dielectric layer.

The encapsulating structure may furthermore include a sealing layer covering the encapsulating layer so as to make the cavity hermetic, and in which the substrate comprises a tie layer placed facing the through-orifice of the corresponding membrane and suitable for ensuring the adhesion of the material of the sealing layer.

The tie layer may extend under the whole of the corresponding membrane and is made of a material suitable for furthermore reflecting the electromagnetic radiation to be detected.

The tie layer may furthermore include sections on which the holding pins rest, and/or sections on which the internal bearing sections rest, and is made of a material able to ensure the adhesion of the holding pins and/or the bearing sections.

The encapsulating layer may comprise a peripheral wall that encircles the matrix of detectors, and that has a cross section, in a plane parallel to the plane of the substrate, of square or rectangular shape, the corners of which are rounded.

The invention also relates to a method for producing a device for detecting electromagnetic radiation having any one of the preceding features, including steps of:
  realizing a matrix of detectors on a substrate by depositing a plurality of layers including two sacrificial layers that are stacked one on top of the other;
  etching the sacrificial layers locally as far as the substrate, so as to form on the one hand a continuous peripheral trench on the border of the matrix of detectors, and on the other hand at least one local trench located between two adjacent detectors;
  realizing an encapsulating structure by conformal deposition of an encapsulating layer on the unetched layers and in the trenches, such that the encapsulating layer extends continuously above and around the matrix of detectors and includes at least one internal bearing section in the local trench;
  removing the sacrificial layers in order to form a cavity in which the matrix of detectors is located.

BRIEF DESCRIPTION OF THE DRAWINGS

Other aspects, aims, advantages, and features of the invention will become more clearly apparent on reading the following detailed description of preferred embodiments thereof, this description being given by way of nonlimiting examples and with reference to the appended drawings.

DETAILED DESCRIPTION OF PARTICULAR EMBODIMENTS

In the figures and in the rest of the description, references that are the same represent identical or similar elements.

Figure 3:
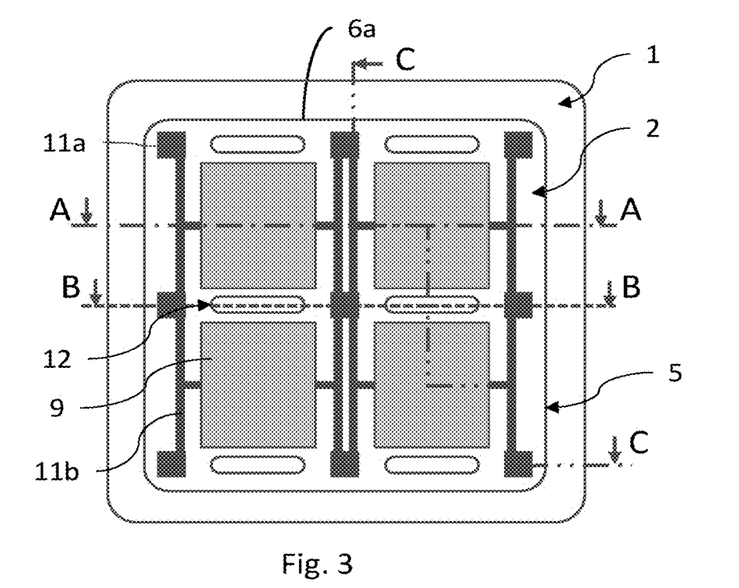
FIG. 3 is a schematic representation of a top view of a detecting device according to one embodiment.
Figure 4:
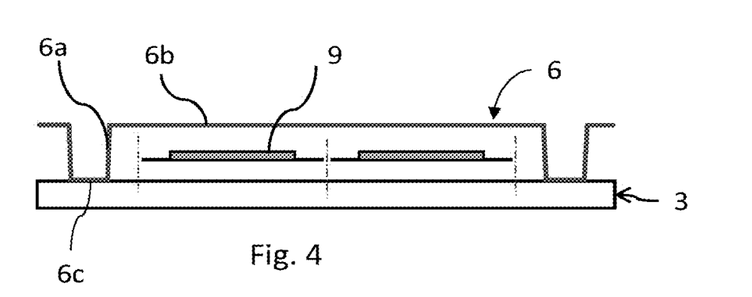
FIG. 4 is a cross-sectional schematic view in the plane A-A of the detecting device shown in FIG. 3.
Figure 5:
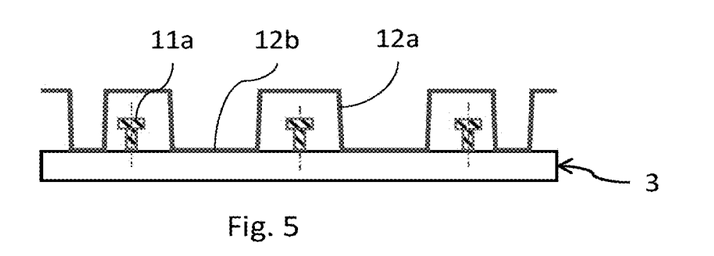
FIG. 5 is a cross-sectional schematic view in the plane B-B of the detecting device shown in FIG. 3.

FIGS. 3 to 5 illustrate an exemplary device for detecting electromagnetic radiation according to one embodiment.

In this example, the device 1 for detecting electromagnetic radiation is suitable for detecting infrared or terahertz radiation. It includes a matrix of thermal detectors 2 that are what are referred to as elementary detectors, here placed in a 2×2 matrix. This example is given merely by way of illustration, more complex matrices, for example including up to 1024×768 elementary detectors, being producible.

It comprises a substrate 3, for example made of silicon, comprising a read circuit (not shown) for example produced in CMOS technology, allowing the biases required to operate the detectors and read the information issued therefrom to be applied.

The thermal detectors 2 each comprise a section suitable for absorbing the radiation to be detected. This absorbing section is generally thermally insulated from the substrate and may be placed on a membrane 9, which is what is referred to as an absorbing membrane, suspended above the substrate 3 by thermally insulating holding elements 11 such as anchoring pins 11*a* associated with thermally insulating arms 11*b*. The membranes 9 are spaced apart from the substrate 3 by a distance typically comprised between 1 μm and 5 μm, and preferably 2 μm when the detectors are designed to detect infrared radiation the wavelength of which is comprised between 8 μm and 14 μm.

In the rest of the description, the thermal detectors 2 are bolometers the absorbing membrane 9 of which includes a thermistor material the electrical conductivity of which varies as a function of the temperature of the membrane. However, this example is given by way of illustration and is nonlimiting. Any other type of thermal detector may be used, for example ferroelectric or pyroelectric detectors or even thermopiles.

The thermal detectors 2 may be arranged close together, especially by connecting the thermally insulating arms 11*b* of various thermal detectors to a given anchoring pin 11*a*, the read architecture of the thermal detectors then being adapted, as documents EP1106980 and EP1359400 describe. An improvement in the sensitivity of the detectors 2 results due to the increased length of the insulating arms 11*b* and an increase in the fill factor achieved by decreasing the area of each pixel not dedicated to the absorption of electromagnetic radiation. The detecting device is thus particularly appropriate for small matrix pitches, for example between 25 μm and 17 μm, or even 12 μm.

The detecting device 1 includes an encapsulating structure 5, or capsule, that defines, with the substrate 3, a hermetic cavity 4 inside of which the matrix of detectors 2 is placed. The encapsulating structure 5 is formed from a thin encapsulating layer 6 that is deposited so that it has a peripheral wall 6*a* that encircles the matrix of detectors 2 and a top wall 6*b* that extends over the detectors 2. The top wall 6*b* is substantially planar and extends over the suspended membranes 9 at a distance therefrom for example comprised between 0.5 μm and 5 μm, preferably 1.5 μm.

As illustrated in FIG. 3, the encapsulating structure 5 furthermore includes at least one internal bearing section 12 located between two adjacent detectors 2, and preferably a plurality of internal bearing sections. Certain internal bearing sections may furthermore be placed on the periphery of the matrix of detectors 2, bordering the cavity 4. The internal bearing sections 12 are formed by the thin encapsulating layer 6, which thus continuously includes the peripheral wall 6*a*, the top wall 6*b* and the internal bearing sections 12.

The internal bearing sections 12 rest (or bear) directly on (or against) the substrate 3. In other words, they make direct contact with the substrate. These internal bearing sections 12 thus allow the mechanical strength of the capsule 5 to be reinforced. The adherence of the capsule 5 to the substrate 3 is thus ensured on the one hand by a bottom portion of the peripheral wall 6*a* of the encapsulating layer 6, which rests on the substrate on the periphery of the cavity, and on the other hand by the one or more internal bearing sections 12 placed in the cavity. This multiplicity of contact areas, distributed bordering the cavity and inside thereof, makes it possible to reinforce the mechanical strength of the capsule.

By resting directly on or bearing directly against the substrate, what is meant is that the internal bearing sections 12 make direct contact with the substrate 3, independently of whether this is with the material making up the substrate or with a thin layer, for example a passivating layer or a tie layer, deposited on the surface of the substrate, and independently of whether these thin layers extend continuously or not. The internal bearing sections therefore do not rest on the substrate via three-dimensional elements such as the elements holding the suspended membranes.

Each internal bearing section 12 has a profile, or outline, delimited, in a plane parallel to the plane of the substrate 3, by a peripheral sidewall 12*a* (see FIG. 5). Thus, as the profile is delimited by the sidewall 12*a*, an outline that is localised spatially in a plane parallel to the plane of the substrate 3 is defined. It is therefore separate from the peripheral wall 6*a* of the encapsulating layer 6 which encircles the matrix of detectors 2. In other words, the sidewall 12*a* of each internal bearing section 12 does not extend continuously as far as the peripheral wall 6*a* of the encapsulating layer 6.

In addition, the internal bearing sections 12 each advantageously have a profile, in a plane parallel to the plane of the substrate 3, that is separate from the others. The bearing sections 12, which are separate and distinct from each other, therefore extend locally in a plane parallel to the plane of the substrate 3. The detectors 2 are thus not continuously encircled, i.e. without discontinuity, by a sidewall 12*a* of an internal bearing section 12.

Specifically, the inventors have observed that, when the bearing sections of the encapsulating layer rest, not on the substrate, but on the elements holding the suspended membranes and more precisely on the anchoring pins, problems arise with adherence of the capsule to the substrate, which may lead to debonding or even destruction of the capsule. Specifically, it would appear that the anchoring pins provide a contact area and planarity that are insufficient to ensure a good adherence of the bearing sections of the encapsulating layer. The detecting device according to the invention thus decreases the risk of the capsule debonding, this risk being related to mechanical stresses in the thin layers of the capsule, whether it be a question of stresses that are intrinsic to said thin layers or extrinsic stresses resulting from differential thermal expansion of the capsule with respect to the substrate.

Thus, the encapsulating structure 5 defines a hermetic cavity 4 that houses the matrix of thermal detectors 2, this cavity 4 taking the form of a network of intercommunicating sub-cavities, or cells, that each house a thermal detector subassembly. The cells are separated from each other by the internal bearing sections. As explained above, this network of cells is delimited by one and the same encapsulating layer 6, which extends continuously so as to form the peripheral wall 6a and top wall 6b of the cavity 4 and the internal bearing sections 12.

Thus, the device 1 for detecting radiation includes a hermetic cavity 4 that houses a plurality of thermal detectors 2, the mechanical strength of the cavity being reinforced by the presence of the one or more internal bearing sections 12 that rest directly on the substrate 3. Housing a plurality of thermal detectors 2 in the cavity allows the fill factor to be increased, for example by decreasing the matrix pitch or by increasing the size of the absorbing membranes 9, or even by mutualizing the anchoring pins 11a. Moreover, parasitic electrical coupling between detectors 2 is avoided insofar as the internal bearing sections 12 do not make contact with the anchoring pins. This device furthermore allows the length of the thermally insulating arms 11b to be increased in order to improve the thermal insulation of the absorbing membranes 9. In addition, with respect to a capsule 5 the encapsulating layer 6 of which includes sidewalls 12a continuously encircling each detector, the capsule 6 comprising one or more bearing sections 12 that are separate from each other allows the fill factor to be increased because the detectors are no longer continually separated by sidewalls 12a (thereby especially permitting the aforementioned anchoring pins to be shared). This also allows the various bearing sections to be positioned only in the desired zones. It also makes it possible to simplify the production process, as there is no need to produce sidewalls continually encircling the detectors.

As illustrated in FIG. 3, at least some of the internal bearing sections 12 are arranged so that the latter extend alongside absorbing membranes 9 of two adjacent detectors 2, along a longitudinal axis passing through two adjacent anchoring pins 11a. Each of these anchoring pins 11a may participate in the holding of these absorbing membranes 9 in their suspended position. In other words, the profile of such a bearing section 12 extends, in a plane parallel to the plane of the substrate 3, along the longitudinal axis passing through the two adjacent anchoring pins, and alongside the borders of the adjacent absorbing membranes 9. This arrangement of the internal bearing sections 12 allows the fill factor to be optimized.

FIG. 4 is a cross-sectional view in the plane A-A of the detecting device 1 shown in FIG. 3. It shows in greater detail the encapsulating layer 6 extending continuously around and above the matrix of detectors 2 so as to form the cavity 4. The peripheral wall 6a forms the border of the cavity and the top wall 6b extends above the detectors 2. The peripheral wall 6a has a peripheral bottom portion 6c that bears (or rests) directly against (or on) the substrate, so as to ensure adhesion of the capsule to the substrate.

FIG. 5 is a cross-sectional view in the plane B-B of the detecting device 1 shown in FIG. 3. In this figure, the internal bearing sections 12 each comprise a peripheral sidewall 12a and a bottom portion 12b, and bear directly against the substrate 3 via the bottom wall 12b. In other words, each internal bearing section 12 makes contact directly with the substrate 3, whether this be with the constituent material of the substrate 3 or, as mentioned above, with a thin layer deposited on the surface of the substrate.

As shown in FIG. 3, the internal bearing sections 12 may have a profile, in the plane of the substrate, of oblong, i.e. elongate, shape. They may each be placed between two adjacent suspended membranes and two neighbouring anchoring pins, so as to optimize the fill factor. The ends of the oblong profile of the internal bearing sections 12 may be rounded, so as to strengthen the adherence of the latter to the substrate 3 by improved distribution of mechanical stresses. The width of the internal bearing sections may be smaller than 1.5 µm and for example comprised between 0.5 µm and 0.8 µm, and their length may be adjusted depending on the space available between the detectors and especially the anchoring pins.

In the example in FIG. 3, the thermally insulating arms 11b mainly extend along a first axis, and the internal bearing sections 12 of the capsule 5 extend along a second axis orthogonal to the first axis, between two adjacent membranes 9 and two neighbouring anchoring pins 11a. The width and length of the internal bearing sections may be optimized by taking advantage of the area left free in this zone by the absence of thermally insulating arms. The area of the internal bearing sections making contact with the substrate may thus be large, thereby improving the adherence and mechanical strength of the capsule.

Figure 6:
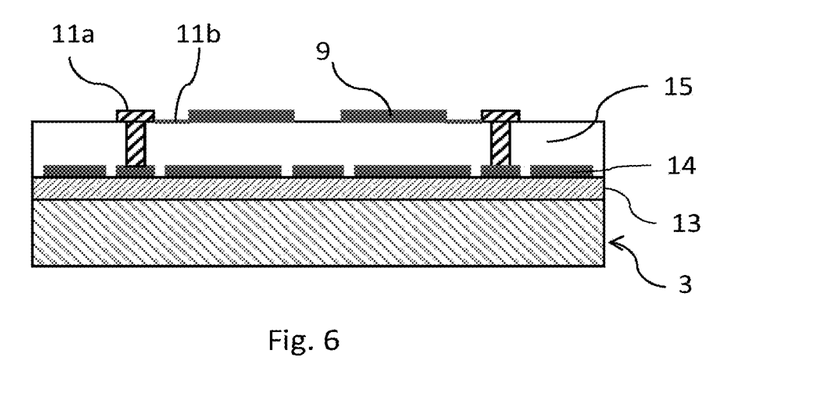
FIGS. 6 to 8 are cross-sectional schematic views of a detecting device according to one embodiment, at various stages of its production process.
Figure 7:
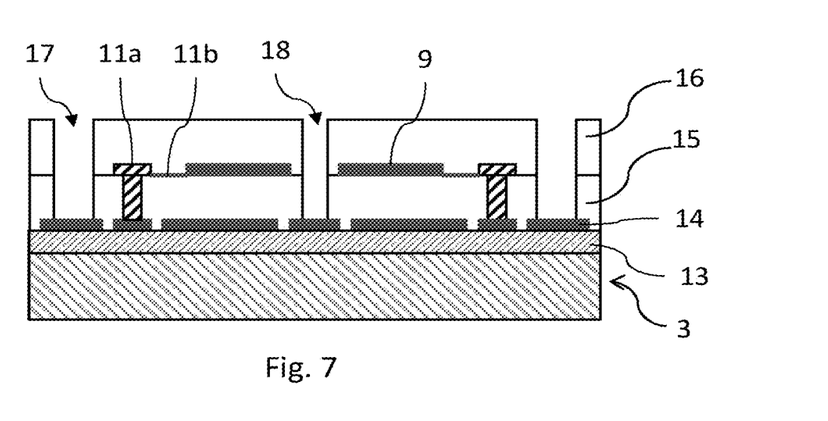
Figure 8:
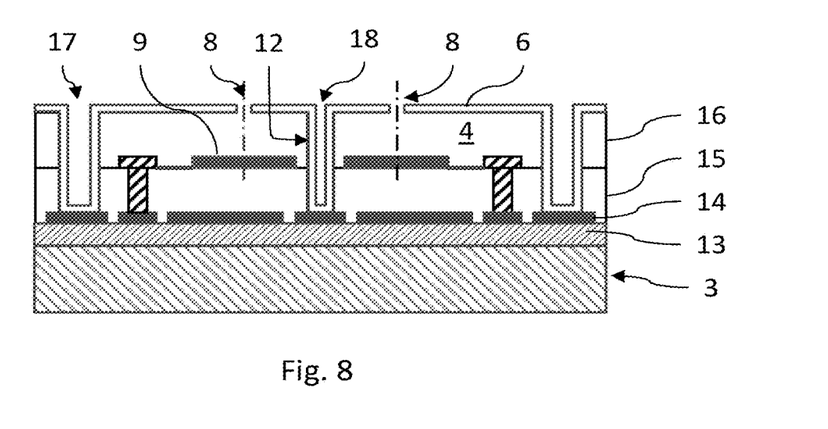

An exemplary production process is now detailed, with reference to FIGS. 6 to 8, which are cross-sectional views, along the axis C-C, of the detecting device shown in FIG. 3.

The detecting device 1 comprises a substrate 3 in which a circuit for reading and controlling the thermal detectors 2 is provided. The substrate 3 may comprise a passivating layer 13, for example made of silicon oxide SiO or silicon nitride SiN. According to one embodiment that is detailed below, the substrate 3 may also comprise an optionally continuous tie layer 14 deposited on the passivating layer 13. The tie layer 14 may be made from titanium or chromium, and have a thickness for example comprised between about 100 nm and 300 nm.

As is known per se, a first sacrificial layer 15 is deposited and the anchoring pins 11a, the thermally insulating arms 11b and the absorbing membranes 9 are produced in and on this sacrificial layer 15. The sacrificial layer may be made from polyimide or even an inorganic material such as silicon oxide, polysilicon or amorphous silicon.

As illustrated in FIG. 7, a second sacrificial layer 16 is then deposited on the first sacrificial layer 15, anchoring elements 11a, thermally insulating elements 11b and absorbing membranes 9. This layer is preferably made of the same material as that of the first sacrificial layer 15 and has a thickness for example comprised between 0.5 µm and 5 µm.

Steps of photolithography and etching, for example RIE etching, are carried out so as to form, preferably during a sequence of common steps, trenches 17, 18 right through the thickness of the sacrificial layers, i.e. as far as the substrate 3 and, more precisely, here as far as the tie layer 14. A first trench 17, intended for subsequent production of the peripheral wall of the encapsulating structure, is produced so as to extend continuously around the matrix of detectors 2, and at least one and preferably a plurality of second trenches 18 are produced between two adjacent detectors 2 with the aim of allowing the internal bearing section(s) to be subsequently formed. The first and second trenches 17, 18 have a substantially identical depth, so that the peripheral wall of the encapsulating structure and the sidewalls of the bearing sections have in fine a substantially identical height. The process is thus simplified, especially as regards the control of the etch depth.

In the case where the sacrificial layers 15, 16 are made of polyimide, the process for producing the trenches may involve depositing an inorganic protective layer (not shown), for example made of SiN or SiO, or even of amorphous silicon, on the surface of the second sacrificial layer 16. A photolithography step then allows apertures to be defined in a resist layer in the locations where the etching of the trenches is to be carried out. The etching of the trenches is then carried out in 2 steps, a first step in which the protective layer is etched, for example by RIE etching, plumb with the apertures in the resist, and a second step in which the first and second sacrificial layers are etched, for example by RIE etching, as far as the substrate, plumb with the apertures obtained in the protective layer in the first etching step. At this stage, the protective layer may be removed.

This sequence of steps is justified by constraints on the chemical compatibility of the layers present and by geometric constraints (aspect ratio of the trenches). Specifically, the resist layer disappears in the second step of etching of the polyimide as these layers are all of organic nature, and therefore similarly sensitive to the etching chemistry implemented in the second step. The aperture in the protective layer is thus used as a relay to continue to limit the etching to the zones in which it is desired to produce the trenches. The process of the second etching step is moreover adapted to guarantee a high etching anisotropy, thereby allowing high aspect ratios and vertical sidewalls (orthogonal to the plane of the substrate) to be obtained without undercutting. It is furthermore adapted to guarantee a high selectivity on the one hand over the protective layer (made of SiN or SiO) and on the other hand over the surface of the substrate, generally covered with an insulating passivating layer made of SiO or SiN. This high selectivity is advantageous because it allows the thickness of the protective layer to be decreased (typically to 30 nm), this being of a nature to facilitate its subsequent removal.

The trenches 17, 18, and especially the second trenches 18 intended for production of the internal bearing sections, have a high aspect ratio. By way of example, trenches of width smaller than or equal to 1.5 µm, for example comprised between 0.5 µm and 0.8 µm, may be produced in a polyimide layer of thickness comprised between 2 µm and 6 µm, 4 µm for example. The length of the second trenches 18 may be adapted depending on constraints on the compact integration and robustness of the capsule, and may be about a few microns to a few millimetres. These trench dimensions make it possible to produce a matrix of thermal detectors having a particularly small matrix pitch, for example 17 µm or even 12 µm.

The tie layer 14 is preferably made from a material over which the etching of the trenches is selective, so as to avoid any etching of the substrate. The material may be titanium or chromium and the tie layer may have a thickness of about 100 nm to 300 nm.

As shown in FIG. 8, a thin encapsulating layer 6, which is transparent to the radiation to be detected, is then deposited using a conformal deposition technique suitable for obtaining a good coverage of the vertical flanks of the trenches 17, 18, with a substantially constant layer thickness. It may for example be a question of an amorphous silicon layer produced by CVD or by iPVD, of a thickness typically comprised between about 200 nm and 2000 nm when it is measured on a flat surface. The deposition of the encapsulating layer 6 on a surface structured with trenches including at least one continuous peripheral trench 17 (closed perimeter) leads to the formation of the capsule 5, produced with the material of the encapsulating layer and forming, making contact with the substrate 3, a cavity 4 in which the matrix of detectors is housed. The coverage of the flanks of the internal trenches 18 by the encapsulating layer 6 allows the shape of the internal trenches to be reproduced in order to form internal bearing sections 12, preferably of oblong shape with rounded ends. It will be noted that these internal bearing sections 12 may be solid or hollow (made up of two spaced-apart walls) depending on whether the width of the internal trenches 18 is small or large relative to the thickness of the encapsulating layer 6, respectively.

Through-orifices, forming exhaust vents 8 intended to allow the removal of the sacrificial layers 15, 16 from the cavity 4, are then produced by photolithography and etching in the encapsulating layer 6. Each vent 8 may be square, rectangular, circular, or even oblong in shape.

Next, the sacrificial layers 15, 16 are removed by preferably gas-phase or vapour-phase (depending on the nature of the sacrificial layers) chemical attack (gas-phase attack is used in the polyimide case described here), so as to form the cavity 4 housing the matrix of detectors 2, and the internal bearing sections 12.

A sealing layer (not shown in FIG. 8) is then deposited on the encapsulating layer 6 with a sufficient thickness to ensure the exhaust vents 8 are sealed or blocked. The sealing layer is transparent to the electromagnetic radiation to be detected and may have an antireflection function in order to optimize the transmission of the radiation through the encapsulating structure. In this respect, it may be formed from sublayers of germanium and zinc sulphide in the case where the radiation to be detected lies in the wavelength range extending from 8 µm to 12 µm, for example a first sublayer of germanium of about 1.7 µm thickness then a second sublayer of zinc sulphide of about 1.2 µm thickness. The sealing layer is preferably deposited by a vacuum thin-film deposition technique such as electron-beam vacuum evaporation (EBPVD) or such as ion beam or cathode sputtering. Thus a hermetic cavity 4 under vacuum or low pressure is obtained in which the matrix of thermal detectors 2 is housed.

Figure 9:
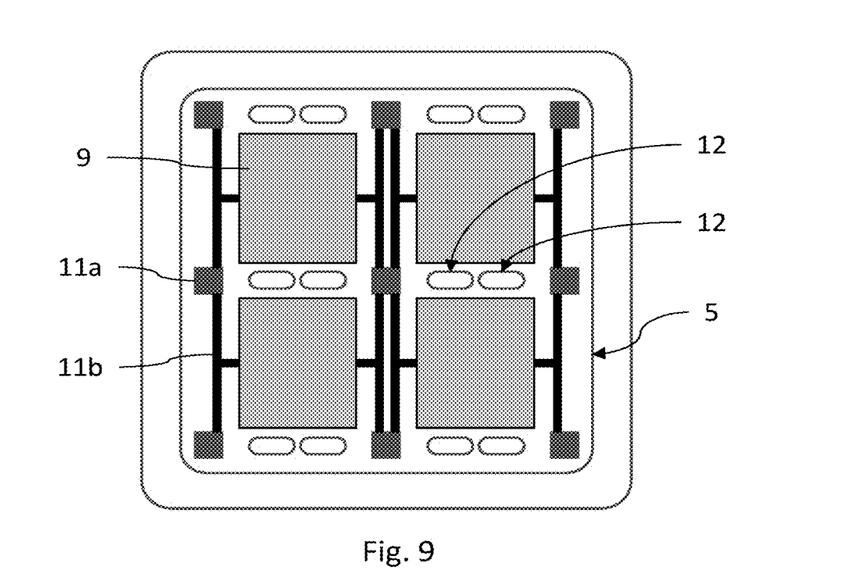
FIGS. 9, and 10a, 10b, 10c are schematic representations of top views of a detecting device according to other embodiments.

FIG. 9 shows another embodiment, which differs from the example in FIG. 3 in which only a single internal bearing section 12 is produced between two adjacent detectors 2, in that a plurality of internal bearing sections, here two internal bearing sections of oblong profile, extend longitudinally along the same axis, and are located between two adjacent detectors 2. As in the example in FIG. 3, the longitudinal axis of the internal bearing sections 12 may be substantially perpendicular to the axis along which the insulating arms 11b mainly extend. Increasing the number of internal bearing sections 12 allows the adherence of the capsule 5 to the substrate 3 to be reinforced and thus the mechanical strength of said capsule to be reinforced.

Figure 10A:
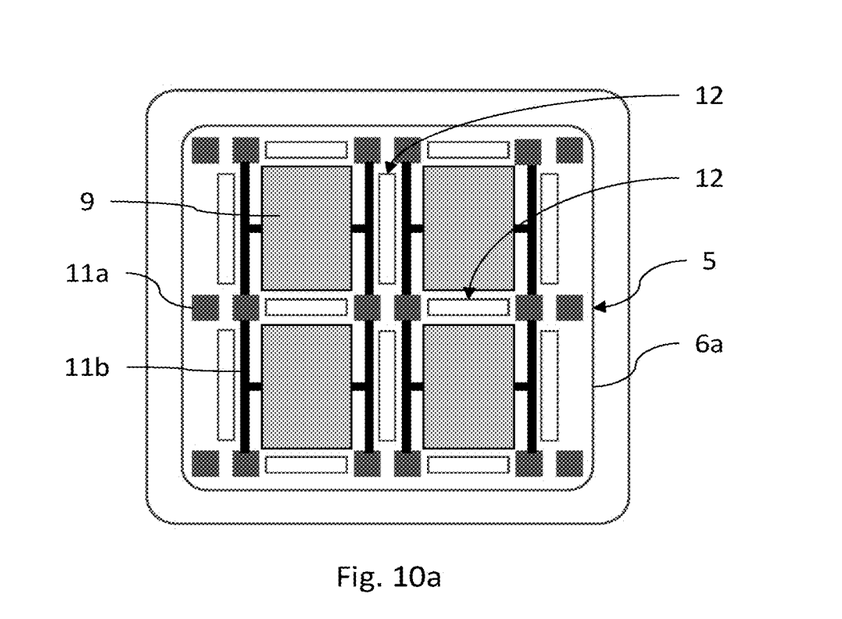

FIG. 10a shows another embodiment in which each detector 2 is connected to four anchoring pins 11a some of which are common to two directly neighbouring detectors located in the same column (or in the same row). This architecture both allows the mechanical strength of the suspended membranes 9 to be improved and permits the matrix of detectors to be read sequentially row by row (or column by column, respectively) as it is conventional to do using reading means located, at the end of the column (or at the end of the row, respectively), in a read circuit produced in the substrate of the device. The sensitivity of the detectors is improved with this shared anchoring pin architecture as the length of the thermally insulating arms 11b may be increased, and the fill factor is improved by the mutualization of the anchoring points 11a, which do not contribute to the capture of the infrared signal.

In this example, the internal bearing sections 12 of the capsule 5 are preferably positioned at the repetition pitch of the detectors, in the two dimensions of the matrix of detectors. The shape of the bearing sections 12 is essentially linear and those that are colinear with the insulating arms 11b are advantageously arranged between the arms of the detectors 2 of a given row. Positioning the bearing sections along two axes is of a nature to reinforce the adherence of the capsule to the substrate.

Advantageously, internal bearing sections 12 may also be produced between the edge detectors and the peripheral wall 6a of the capsule 5. These additional bearing sections essentially have the function of recreating, for the edge detectors, an environment (especially from an optical point of view) comparable to that of core detectors. Another way of decreasing these edge effects would be to provide, on the periphery of the matrix, rings of dummy detectors that would not contribute to the video signal of the matrix-array device. Rings of one to a few, typically two, detectors satisfactorily provide this function.

Figure 10B:
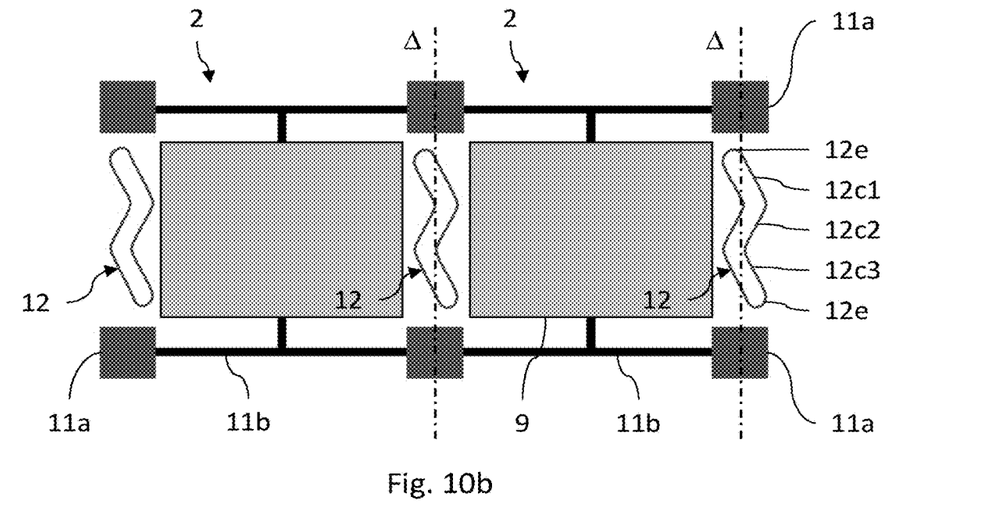
Figure 10C:
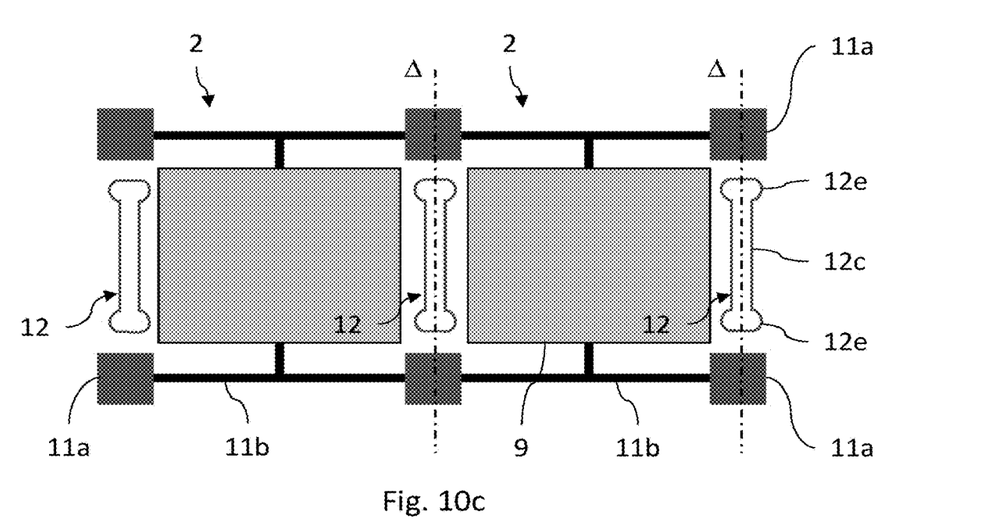

FIGS. 10b and 10c illustrate two other exemplary internal bearing sections 12. In the example in FIG. 10b, at least one internal bearing section 12 extends along a longitudinal axis Δ passing between two adjacent anchoring pins 11a. The profile of the internal bearing section 12 is formed from a plurality of pairwise inclined longitudinal portions 12c1, 12c2, 12c3. In this example, it is formed from three longitudinal portions 12c1, 12c2, 12c3, each portion 12c1, 12c2, 12c3 extending along a specific axis making a non-zero angle to the longitudinal axis Δ. Preferably, the peak-to-peak amplitude, along a transverse axis orthogonal to the axis Δ, of the bearing section 12 is lower than or equal to the size of the anchoring pins 11a along the same transverse axis.

In the example in FIG. 10c, at least one internal bearing section 12 has a profile, in a plane parallel to the plane of the substrate 3, including a central portion 12c that extends between two longitudinal ends 12e. The profile widens at at least one of the ends 12e. In other words, the profile of the internal bearing section has a width that is, at least one end 12e, larger than the average width of the central portion 12c. Preferably, the maximum width, along a transverse axis orthogonal to the axis Δ, of the bearing section 12 is smaller than or equal to the size of the anchoring pins 11a along the same transverse axis.

These various variants, illustrated in FIGS. 10b and 10c, may be combined together and/or be modified. They may also be applied to any of the types of internal bearing section illustrated in FIG. 10a. The profile of the bearing section 12 may include two, three or more longitudinal portions 12c1, 12c2 . . . , and may or may not widen at one or both of the longitudinal ends 12e of the profile. It is also possible for the central portion 12c of the profile to widen one or more times. These various variants have the advantage of modifying the distribution of the mechanical stresses experienced by the encapsulating layer 6 and therefore by the capsule 5. Thus the risk of concentration of mechanical stresses in a zone or along a privileged axis is limited, thereby contributing to improve the mechanical strength of the capsule 5.

Figure 11:
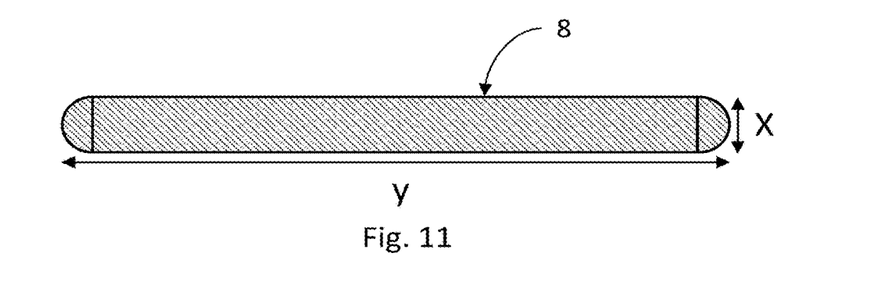
FIG. 11 is a schematic representation of a top view of an exhaust vent according to another embodiment, in which the vent has a oblong-shaped profile with rounded edges.

According to one embodiment shown in FIG. 11, the profile of the exhaust vents 8, in a plane parallel to the plane of the substrate, has an oblong, i.e. elongate, shape. Its small dimension X, measured in the direction of the width of the vent, is chosen so as to ensure effective sealing of the vent, and its large dimension Y, measured in the direction of the length of the vent, may be adjusted to facilitate the transit of reactive species and reaction products of the etching of the material of the sacrificial layers 15, 16 during removal, thereby allowing the time taken to remove the sacrificial layers to be optimized. In this respect, the width X may typically be comprised between about 150 nm and 600 nm, whereas the large dimension Y may be about a few microns, 5 μm for example.

Advantageously, the vents 8 have an oblong shape with rounded longitudinal ends. By way of example, the rounded shape of an end may have a radius of curvature equal to half the width X of the vent. More generally, it may correspond to a continuous, circular or elliptical, curved shape, such as in the example in FIG. 11, or to a succession of right or substantially curved segments. The inventors have shown that this vent shape makes it possible to avoid the risk of cracks initiating in the encapsulating layer 6 and propagating through the sealing layer 7. Specifically, it is essential to prevent any risk of cracks that are liable to break the hermeticity of the cavity, insofar as a local hermeticity flaw could lead to operational failure of the entire device.

Figure 12:
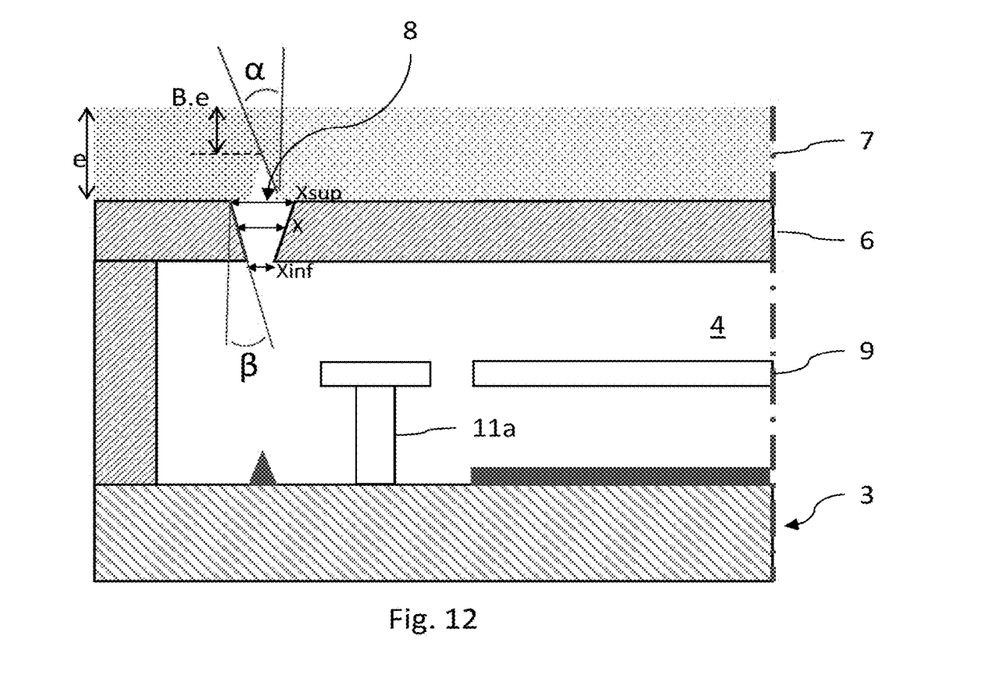
FIG. 12 is a partial cross-sectional view of a portion of a detecting device according to one embodiment.

As FIG. 12 shows, the inventors have observed that the sealing layer 7, bordering the vents 8, has a tendency to extend vertically, i.e. in the direction of the thickness of the layer 7, with a non-zero angle α relative to the normal, i.e. relative to an axis orthogonal to the plane of the substrate, in particular when a vacuum thin-film deposition technique, such as low-pressure sputtering or evaporation, is used. The average width X of the vents may be chosen depending on the thickness e of the deposited sealing layer 7, on the fractional thickness B of the sealing layer actually ensuring the hermeticity, and on the growth angle α, from the following relationship:

$$X = 2 \cdot e \cdot (1-B) \cdot \tan(\alpha)$$

By way of example, when an evaporation technique is used to deposit the sealing layer, the angle α is typically about 15° to 20°. For a thickness e of sealing layer of 1800 nm, and if it is desired for 1200 nm of layer to ensure the hermeticity (B=2/3), an average vent width X of about 320 nm to 410 nm is obtained.

Moreover, it is advantageous for the exhaust vent 8 to have a cross section, in a plane orthogonal to that of the substrate, that has a shape the aperture of which increases in size with distance from the substrate 3. In other words, the vent 8 has a transverse profile that is flared toward the exterior of the cavity. It is narrower level with its bottom orifice opening onto the cavity and wider level with its top orifice opening outside of the cavity. By way of example, the width $X_{inf}$ level with the bottom orifice may be about 100 nm to 350 nm whereas the width $X_{sup}$ level with the top orifice may be about 250 nm to 800 nm. In this example, the encapsulating layer 6 has a thickness of about 800 nm. It results from this shape of the cross section of the vent 8 that the quality of the seal sealing the vent is improved. More precisely, for a given thickness e of sealing layer, the inventors have observed that the fraction B of layer that actually provides the seal is larger in the case where the vent has a right cross section, thereby improving the quality of the seal.

Such a vent cross section may be obtained by generating a slope in the flanks of the resist before etching of the vent, either by post-development reflow or by modifying the conditions of exposure and/or development of the resist (exposure dose, focus, temperature and duration of post-exposure anneals) as is known by those skilled in the art.

Such a vent cross section may also be obtained during the dry etching of the vent by adding an isotropic component to the etching, for example by adding oxygen to the chemistry used to etch the vent. In the case where the encapsulating layer 6 is made of silicon, the addition of fluorine-containing gases, such as $SF_6$ or $CF_4$, to the etch chemistry will also contribute to increasing the isotropic component of the etching.

The beneficial effect of this particular vent profile especially manifests itself when the angle β that the profile of the vent makes to the normal to the substrate is larger than the angle α defined above. By way of example, for an encapsulating layer thickness of 800 nm and for a bottom orifice width $X_{inf}$ of 100 nm, the top orifice width $X_{sup}$ may be larger than 530 nm (β=15°), or even larger than 680 nm (β=20°).

In the embodiment in FIG. 12, the vent 8 is placed on the border of the cavity 4, but it could be located at other cavity locations.

Figure 13:
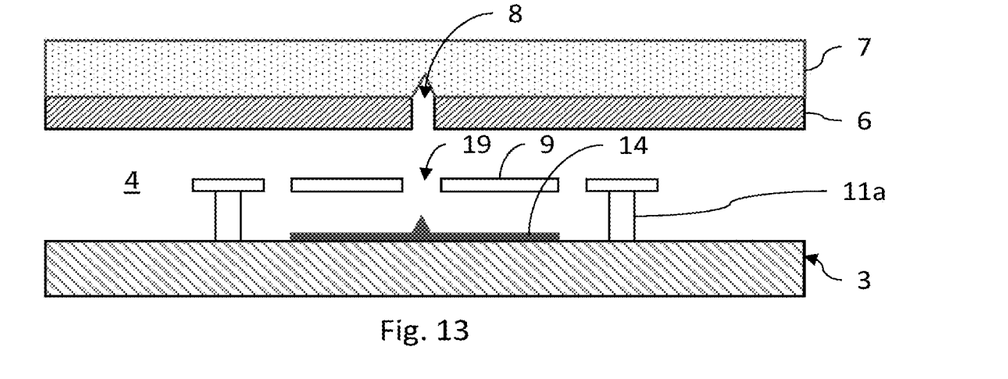
FIG. 13 is a cross-sectional schematic view of a detecting device according to one embodiment, in which a single exhaust vent per detector is placed facing the suspended membrane and in which the membrane includes a through-orifice located plumb with the exhaust vent.

In this respect, according to one embodiment illustrated in FIG. 13, the encapsulating layer 6 includes at least one exhaust vent 8 placed so that at least one thermal detector 2 present in the cavity 4 has a single exhaust vent 8 located facing its absorbing membrane 9, preferably plumb with the centre of the absorbing membrane 9. In other words, the single vent 8 is located plumb with the absorbing membrane 9, i.e. perpendicular to the absorbing membrane 9. The single vent 8 is therefore not located facing anchoring pins 11*a* or thermally insulating arms 11*b*.

Thus, production of the vent is simplified by its distance from the zones of high topography that are the trenches, thereby allowing a good dimensional control of the shape of the vent to be obtained. In addition, the inventors have observed that positioning a single vent facing the absorbing membrane of the thermal detector makes it possible to avoid, after removal of the sacrificial layers, the presence of sacrificial layer residues attached to the membrane. The presence of these residues has especially been observed when at least two vents per detector are placed on either side of the membrane. The residues are generally located in a zone equidistant from the various vents, the suspended membrane being located in said zone. They may modify the optical and/or electrical and/or thermal properties of the membrane (for example by increasing the mass of the membrane, thereby decreasing the response time of the detector), or even modify the residual pressure level under the effect of gradual degassing. In addition, the step of removing the sacrificial layers is optimized, especially in terms of the time taken to remove the sacrificial layers, by way of the combined effect of the oblong shape of the vent and the central position thereof with respect to the detector.

The encapsulating layer includes at least one exhaust vent and preferably a plurality of exhaust vents placed so that at least some of said thermal detectors 2 each have a single exhaust vent 8 located facing the corresponding absorbing membrane 9. Each thermal detector of the matrix may have a single vent placed facing the corresponding absorbing membrane. Alternatively, only some of the thermal detectors may each have a single exhaust vent located facing the corresponding membrane. It is then advantageous, for a row or a column of thermal detectors, for the exhaust vents to be placed above every Nth uneven detector. This makes it possible to avoid the presence of sacrificial layer residues on the absorbing membrane of a detector not provided with an exhaust vent. By way of example, in the case where N=3, two neighbouring detectors not provided with an exhaust vent are placed between two detectors each provided with a single exhaust vent. In this example, none of the thermal detectors, whether they are or are not provided with an exhaust vent, will see their absorbing membrane degraded by the presence of sacrificial layer residues. This variant embodiment is particularly advantageous in the case of small matrix pitches, for example when the positional pitch of the detectors is about 12 μm or less.

It is then advantageous to provide a through-orifice 19 in the membrane 9 of the detector, located plumb with the corresponding vent 8, and the size of which is equal to or larger than the size of the vent 8, so as to achieve a margin of safety allowing for possible misalignment of the vent and/or orifice of the membrane, which may be about 200 nm to 500 nm. Thus, during the deposition of the sealing layer, a section of the sealing material that is liable to fall through the vent will not be deposited on the membrane but will instead pass through the orifice of the membrane and be deposited on the substrate.

It is then advantageous to provide (on the substrate) a tie layer, under the membrane 9, in line with the through-orifice 19, in order to ensure the fallen sealing agglomerate, if there is one, remains held in place. Advantageously, this tie layer may be a section of the aforementioned tie layer 14, the material of which is then suitable for furthermore ensuring the attachment of the sealing material. Thus, in the step of sealing the cavity, in the case where a quantity of sealing layer material passes through the vent, said quantity will deposit on and adhere to the tie layer. This especially makes it possible to relax constraints on the type of material present on the surface of the substrate, and more precisely on the material used to passivate the topside of substrate.

This tie layer 14 may extend, continuously or discontinuously, over various zones of the cavity, and more precisely: under the membrane 9 and facing its through-orifice 19, in order to ensure attachment of the sealing material liable to fall through the vent 8; under the entirety of the membrane 9 in order to provide an optical function enabling reflection of the radiation to be detected; level with the various trenches 17, 18 in order to protect the substrate 3 during the etching step used to form the trenches and to improve the attachment of the encapsulating layer 6 to the substrate; and level with the anchoring pins 11*a* in order to improve the attachment of the pins to the substrate and improve the electrical conduction between the pins and the read circuit placed in the substrate. The thickness of this tie layer is preferably constant over its entire extent, and especially in the various aforementioned zones. This tie layer may be made of chromium or titanium, aluminium or titanium nitride or of another suitable material and for example takes the form of a stack made from the aforementioned materials, and have a thickness of about 100 nm to 400 nm.

Figure 14:
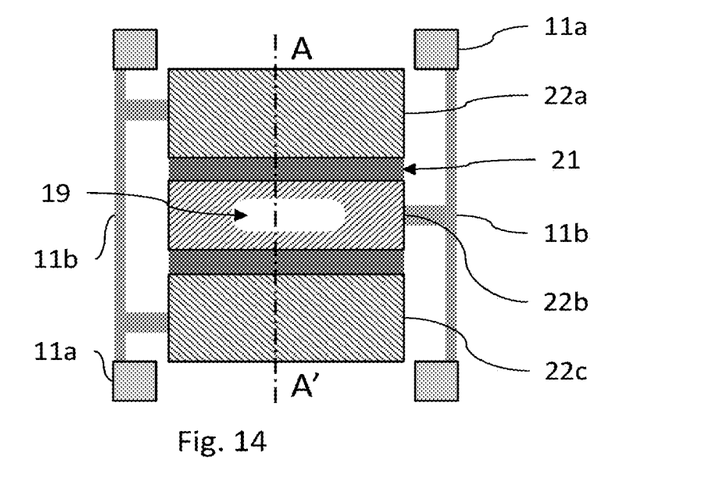
FIGS. 14 and 15 are schematic views of a detecting device according to another embodiment, in which the suspended membrane includes an intermediate dielectric layer.
Figure 15:
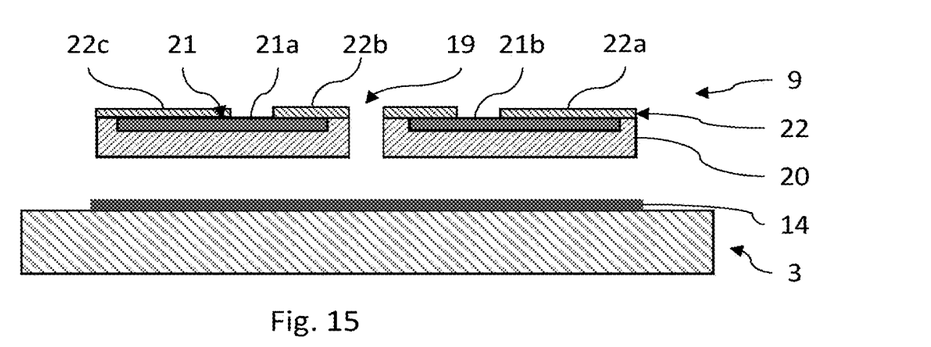

According to one embodiment shown in FIGS. 14 and 15, the detectors 2 the membrane 9 of which includes a through-orifice 19 have a membrane architecture with an intermediate electrical insulation, such as described in document EP1067372.

FIG. 14 is a top view of an absorbing membrane 9 of a bolometric detector with this type of architecture. The absorbing membrane 9 is connected to four anchoring pins 11*a* and is suspended by way of two thermally insulating arms 11*b*. FIG. 15 is a cross-sectional view of the plane A-A in FIG. 14.

The membrane 9 includes a layer of a bolometric (and therefore resistive) material 20, for example doped amorphous silicon or vanadium oxide. It also includes a layer of a dielectric material 21 that is placed on the bolometric layer 20 and that covers the latter in two separate zones 21*a*, 21*b*.

It also includes a layer of an electrically conductive material 22, which layer is deposited on the dielectric layer 21 and the bolometric layer 20 and locally etched over the entire width of the membrane as far as the dielectric layer, so as to form three separate conductive sections 22a, 22b, 22c. The conductive layer 22 extends onto the insulating arms 11b in order to electrically connect the three sections 22a, 22b, 22c to the read circuit. Among the three conductive sections, two sections 22a, 22c that are located at the ends of the membrane 9 are electrically connected to two portions of the same insulating arm 11b and thus form two electrodes intended to be raised to the same electrical potential. These two end sections 22a, 22c flank a central section 22b connected to another insulating arm that forms an electrode intended to be raised to another electrical potential.

The dielectric layer 21 is etched so that each electrode 22a, 22b, 22c makes electrical contact with the bolometric material 20 and so that the end electrodes 22a, 22c are electrically insulated from the central electrode 22b.

In this embodiment, the absorbing membrane 9 includes a through-orifice 19, here of oblong profile, placed at the centre of the central electrode 22b. Preferably, the orifice 19 is placed level with where the dielectric layer 21 is etched. The orifice 19 thus only passes through the central electrode 22b and the bolometric layer 20. Preferably, the distance, measured in the direction of the width of the orifice 19, between the border of the orifice and the border of the dielectric layer 21, facing the orifice, is larger than or equal to the thickness of the bolometric layer 20 making contact with the central electrode 22b in this zone. Any influence the orifice might have on the electrical properties of the absorbing membrane is minimised or even suppressed by positioning the orifice in this way.

The example described with reference to FIGS. 14 and 15 shows a bolometric layer 20 in the bottom portion of the membrane 9, on which the dielectric layer 21 and the electrodes 22a, 22b, 22c rest. However, an inverted arrangement of the layers is also producible, in which the electrodes 22a, 22b, 22c are located in the bottom portion of the membrane 9, on which electrodes rest the dielectric layer 21 then the bolometric layer 20.

According to one embodiment, shown in FIGS. 3, 9 and 10, the encapsulating layer 6 is deposited on the perimeter of the matrix of detectors 2 so that the cross section of the layer has, in a plane parallel to the plane of the substrate, a shape with rounded corners.

Figure 16:
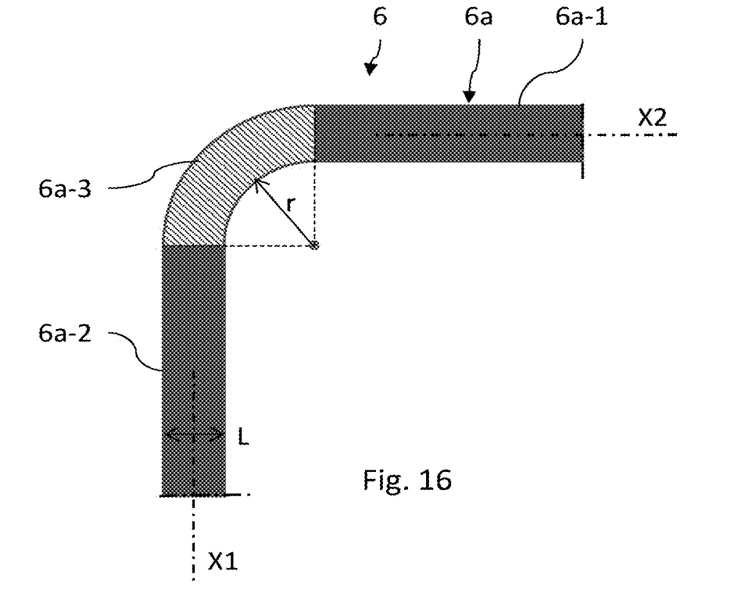
FIGS. 16 and 17 are partial schematic representations of top views of the peripheral wall of the encapsulating layer according to one embodiment, in which the wall includes a rounded section.
Figure 17:
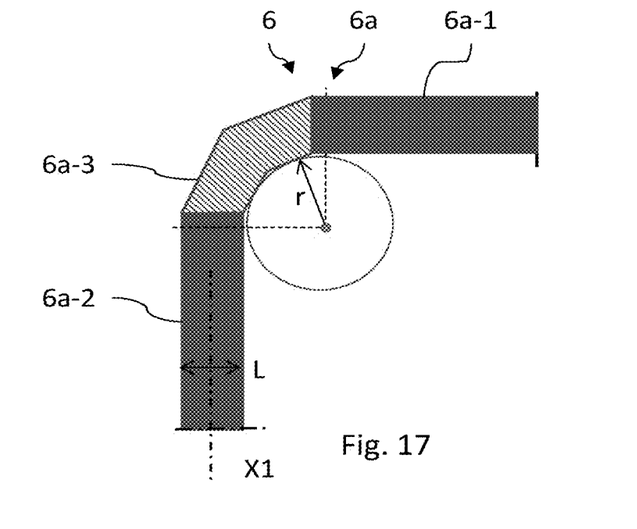

As FIGS. 16 and 17 show, the peripheral wall 6a of the encapsulating layer 6 is formed, at each corner, from two sections 6a-1, 6a-2 extending substantially rectilinearly, each along an axis X1, X2 that are orthogonal one to the other. The rectilinear sections 6a-1 and 6a-2 do not join at a right angle but are connected to each other by a rounded section 6a-3.

By rounded section, what is meant is a section having at least one curved and for example circular or elliptical segment, or at least one right segment, and preferably a plurality of right segments, extending along an axis that is not colinear with the respective axis of the rectilinear sections.

FIG. 16 shows an example of a rounded section 6a-3 taking the form of a circular arc segment connecting the rectilinear sections 6a-1 and 6a-2. The radius of this circular arc, measured from the external surface of the rounded section 6a-3, i.e. the surface oriented toward the exterior of the cavity (escribed circle), may be larger than or equal to two times the width L of the peripheral wall. Preferably, the dimensions of the rounded section are such that the radius of an inscribed circle, i.e. a circle tangent to the internal surface oriented toward the cavity, of the rounded section is larger than or equal to two times the width L.

The width L is defined as the average width of a substantially rectilinear section 6a-1, 6a-2 of the peripheral wall 6a. The rounded section 6a-3 preferably has a width substantially equal to that of the rectilinear sections.

FIG. 17 shows another example of a rounded section, as a variant to that in FIG. 16. In this example, the rounded section 6a-3 is formed by a succession of two right segments that are inclined one relative to the other. It is possible to define an escribed circle, tangent to the external surface of each segment. The orientation of the segments may be such that the radius of the escribed circle is larger than or equal to two times the width L of the peripheral wall. Preferably, the orientation of the segments is such that the radius of an inscribed circle, i.e. a circle tangent to the internal surface of the segments, is larger than or equal to two times the width L.

By way of example, the width L of the peripheral wall of the encapsulating layer may be comprised between about 200 nm and 2 μm. The radius of the escribed or inscribed circle is larger than or equal to a value comprised between 400 nm and 4 μm depending on the width L, for example 2 μm in the case of a width L equal to 800 nm.

The inventors have observed that the production of rounded sections at the corners of the capsule improves the adherence of the latter to the substrate. Specifically, it has been observed that the adherence of the capsule is not uniform along the peripheral wall and that the corners of the capsule have a reinforced adherence when rounded sections are produced.

Thus, when the capsule includes rounded corners and internal bearing sections, the overall adherence of the capsule to the substrate is reinforced, by virtue of the combined effect of the multiplicity of bearing areas and the local reinforcement of the adherence at the corners of the cavity.

The invention claimed is:

1. A device for detecting electromagnetic radiation, comprising:
   a substrate;
   a matrix of thermal detectors disposed on the substrate; and
   a structure encapsulating the matrix of thermal detectors, comprising an encapsulating layer extending continuously around and above the matrix of thermal detectors so as to define with the substrate a cavity in which the matrix of thermal detectors is disposed,
   the encapsulating layer comprising at least one internal bearing section, which bears directly against the substrate between two adjacent thermal detectors of said matrix, said at least one internal bearing section comprising a sidewall and a peripheral wall, the sidewall being separate from the peripheral wall in a plane parallel to a plane of the substrate, and the peripheral wall encircling the matrix of thermal detectors.

2. The detecting device according to claim 1, wherein the at least one internal bearing section includes a plurality of internal bearing sections each of which includes the sidewall, the sidewall of said each internal bearing section delimiting a profile of said each internal bearing section in the plane parallel to the plane of the substrate, each of said profiles being separate from one another.

3. The detecting device according to claim 1, wherein thermal detectors in said matrix each include an absorbing membrane configured to absorb radiation to be detected, the absorbing membrane being suspended above the substrate and thermally insulated therefrom by anchoring pins and thermally insulating arms, and wherein the at least one internal bearing section extends alongside respective absorbing membranes of two adjacent thermal detectors in said matrix along a longitudinal axis that passes through two adjacent anchoring pins.

4. The detecting device according to claim 3, in which each of said anchoring pins holds above the substrate the absorbing membranes of the two adjacent thermal detectors.

5. The detecting device according to claim 1, wherein the at least one internal bearing section has a profile, in the plane parallel to the plane of the substrate, formed from a plurality of pairwise inclined longitudinal portions, and/or extending along a longitudinal axis that passes between two ends of said profile, said profile widening at at least one of said two ends.

6. The detecting device according to claim 1, wherein the internal bearing section has a profile, in the plane parallel to the plane of the substrate, of oblong shape and having rounded longitudinal ends.

7. The detecting device according to claim 3, wherein the encapsulating layer further comprises a plurality of through-orifice exhaust vents disposed such that at least some of the thermal detectors in said matrix each have a single exhaust vent facing corresponding absorbing membranes of said detectors.

8. The detecting device according to claim 7, wherein each absorbing membrane includes a through-orifice facing the corresponding exhaust vent that is of equal or larger size than that of said corresponding exhaust vent.

9. The detecting device according to claim 8, wherein the absorbing membrane includes a stack of a bolometric layer, a dielectric layer structured so as to fun two separate sections, and an electrically conductive layer structured so as to form three electrodes, wherein two of said electrodes flank a third of said electrodes, said two electrodes being configured to be raised to a same electrical potential, said third electrode being a central electrode configured to be raised to a different electrical potential than said two electrodes, wherein each of said three electrodes contacts the bolometric layer, and wherein the central electrode is electrically insulated from said two electrodes by the dielectric layer, the through-orifice passing through the central electrode and the bolometric layer in a zone disposed between the sections of the two separate sections of the dielectric layer.

10. The detecting device according to claim 8, wherein the structure encapsulating the matrix of thermal detectors further comprises a sealing layer covering encapsulating layer and hermetically sealing the cavity, and wherein the substrate comprises a tie layer disposed facing the through-orifice of said each absorbing membrane and adhering to the sealing layer.

11. The detecting device according to claim 10, wherein the tie layer extends under a whole of said each absorbing membrane, the tie layer being reflective of said radiation to be detected.

12. The detecting device according to claim 10, wherein the tie layer includes sections on which the anchoring pins are disposed, and/or sections on which the at least one internal bearing section is disposed, the tie layer being configured to adhere to the anchoring pins and/or to the at least one internal bearing section.

13. The detecting device according to claim 1, wherein the peripheral wall encircling the matrix of thermal detectors has a cross section, in the plane parallel to the plane of the substrate, of a square shape having rounded corners or of a rectangular shape having rounded corners.

14. The detecting device according to claim 3, wherein the at least one internal bearing section is physically separated from the anchoring pins and from the thermally insulating arms.

15. A method for producing a device for detecting electromagnetic radiation, comprising:

providing a matrix of detectors on a substrate by depositing on the substrate a plurality of layers including two sacrificial layers stacked one on top of the other;

etching a portion of the two sacrificial layers locally as far as the substrate, forming a continuous peripheral trench along a border of the matrix of detectors, and forming at least one local trench disposed between two adjacent detectors of said matrix;

providing an encapsulating structure by conformal deposition of an encapsulating layer on unetched portions of the two sacrificial layers and in the at least one local trench, such that the encapsulating layer extends continuously around and above the matrix of detectors and includes at least one internal hearing section in the at least one local trench being disposed directly on the substrate between two adjacent detectors of said matrix, said at least one internal bearing section comprising a sidewall and a peripheral wall, the sidewall being separate from the peripheral wall in a plane parallel to a plane of the substrate, and the peripheral wall encircling the matrix of thermal detectors; and removing the unetched portions of the two sacrificial layers, forming a cavity in which the matrix of detectors is disposed.

* * * * *